United States Patent [19]

Narimatsu et al.

[11] Patent Number: 4,523,381
[45] Date of Patent: * Jun. 18, 1985

[54] SCALING DEVICE

[75] Inventors: Akihisa Narimatsu; Hiroyuki Ohkubo, both of Tokyo, Japan

[73] Assignee: Sony Magnescale Incorporated, Tokyo, Japan

[*] Notice: The portion of the term of this patent subsequent to Nov. 27, 2001 has been disclaimed.

[21] Appl. No.: 434,576

[22] Filed: Oct. 15, 1982

[30] Foreign Application Priority Data

Oct. 15, 1981 [JP] Japan ............... 56-152247[U]

[51] Int. Cl.³ .............................. G01B 7/02
[52] U.S. Cl. ..................... 33/125 C; 33/143 L; 33/172 E; 324/208; 377/24
[58] Field of Search .......... 377/24, 97, 101; 324/208, 207; 33/125 C, 143 L, 143 M, 147 N, 148 H, 166, 1 D, 172 E

[56] References Cited

U.S. PATENT DOCUMENTS

| | | | |
|---|---|---|---|
| 3,332,009 | 7/1967 | Seale | 324/208 |
| 3,582,769 | 6/1971 | Brandenburg | 324/208 |
| 3,777,255 | 12/1973 | Young et al. | 324/207 |
| 4,226,024 | 10/1980 | Westerberg et al. | 33/143 L |

FOREIGN PATENT DOCUMENTS 791902  3/1958  United Kingdom ............ 33/125 C

Primary Examiner—William D. Martin, Jr.
Attorney, Agent, or Firm—Lewis H. Eslinger; Alvin Sinderbrand

[57] ABSTRACT

A scaling device employs a first, outer cylinder, a longitudinal scale having detectable indicia thereon, and a second cylinder of lesser diameter than the first cylinder but of greater diameter than the radial extent of the scale. The cylinders and the longitudinal scale are disposed coaxially, with the scale affixed at one end thereof to an end cover plate in one end of the first cylinder. The second cylinder is journalled in a bearing in an end cover plate in the other end of the first cylinder for axial movement relative to the first cylinder over the longitudinal scale. A scale detector element is disposed at one end of the second cylinder to detect indicia on the scale and to generate scale signals in response to longitudinal relative displacement of the first and second cylinders. A third cylinder affixed to and disposed within the second cylinder defines an annulus between the second and third cylinders through which leads from the detector element can extend. A fitting can be provided for admitting pressurized air to the first cylinder. A spring and bearing arrangement can be used for centering the longitudinal scale relative to the cylinders.

10 Claims, 4 Drawing Figures

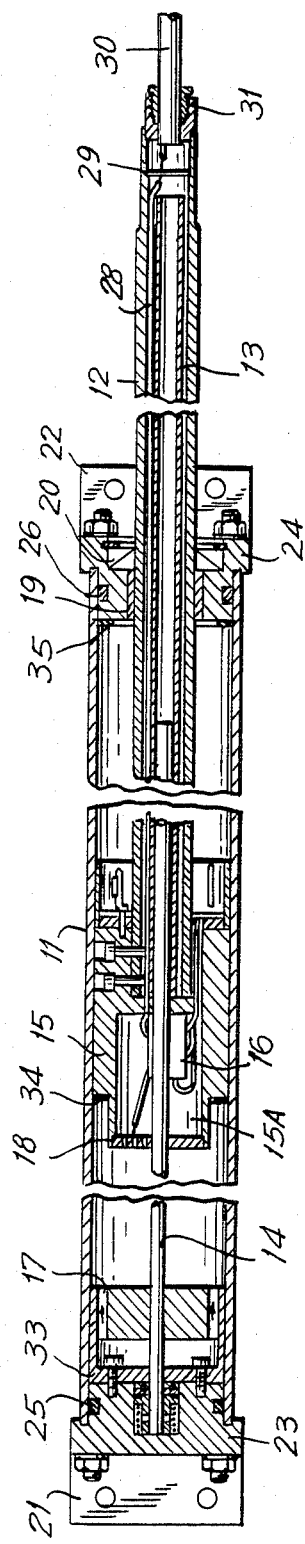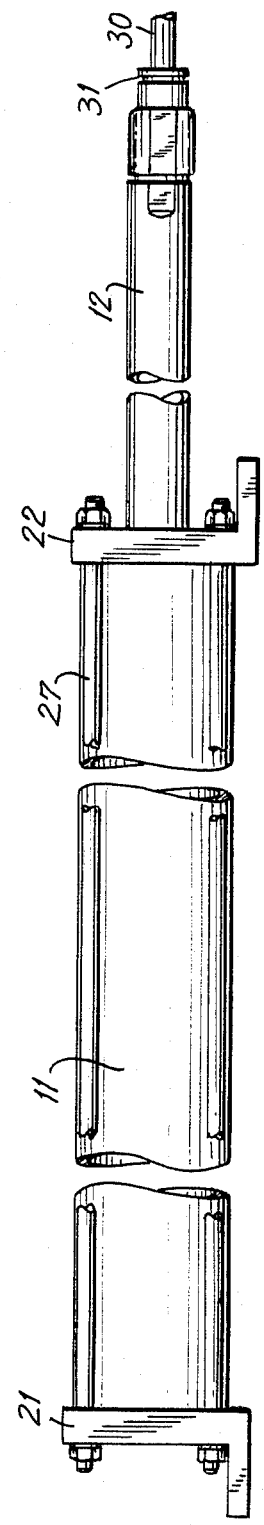

SCALING DEVICE

BACKGROUND OF THE INVENTION

This invention relates to scaling devices, and is more particularly directed to a scaling device in which a reading head provides signals corresponding to indicia recorded on a scale member to indicate accurately any relative displacement between the head and the scaling member. Such a scaling device finds favorable application, for example, in the control of automatic machine tools or industrial robots.

Scaling devices for the direct measurement of displacement of a work table, machine tool, work piece, or movable elements of a machine, are well known. In these devices, a linear scale, for example, a magnetic scale, can operate substantially as disclosed in U.S. Pat. No. 3,597,749. Alternatively, a photoelectric scale can be used. Other previous-employed scaling devices can operate, for example, as shown in U.S. Pat. No. 2,799,835.

Such scaling devices normally employ a scaling mechanism disposed within a casing, and relative displacement in an associated machine or machine tool is detected by means of a detecting element mounted on a carrier extending through an opening in the casing.

Unfortunately, previously-proposed scaling devices require large openings in the casings thereof to permit displacement of the carrier. Therefore, such devices are difficult to construct to be sufficiently waterproof, oil-proof, and dustproof. As a result, such conventional devices cannot be used for extended periods of time under adverse factory conditions where there is a substantial amount of dust, oil, particles of magnetic material, or other contaminants in the atmosphere.

OBJECTS AND SUMMARY OF THE INVENTION

Accordingly, it is an object of this invention to provide a scaling device which permits accurate measurements of displacement, and which is resistant to contaminants which may be found in an adverse or hostile environment, while avoiding the disadvantages of the prior-art devices.

It is a more specific object of this invention to provide a scaling device having a casing with a displacement measuring mechanism therewithin, in which the casing is environmentally sealed so as to exclude environmental contaminants, such as dust, oil, and water, from the interior of the casing.

In accordance with an aspect of this invention, a scaling device comprises a first, outer cylinder, an end cover disposed in one end of the first cylinder to close off the same, a longitudinal scale having detectable indicia thereon and affixed at one end on the end cover, thereby to be axially fixed relative to the first cylinder, and coaxially therewithin. A second cylinder is provided having an inside diameter greater than the radial extent of the scale and an outside diameter less than the inner diameter of the first cylinder. This second cylinder is disposed coaxially with the first cylinder and the scale. A scaling fitting is disposed in another end of the first cylinder and serves to journal the second cylinder for axial longitudinal movement thereof with respect to the first cylinder, with the second cylinder extending through the fitting within the first cylinder and over the scale. A scale detector element is disposed within the first cylinder at one end of the second cylinder to detect the indicia on the scale and to generate scale signals in response to longitudinal relative displacement of the first and second cylinders.

A third cylinder, having an outer diameter less than the inside diameter of the second cylinder can be affixed within the second cylinder and over the scale. These cylinders define an annulus therebetween, through which at least one lead from the detector element can extend to a terminal board at a remote end of the second cylinder.

Preferably, the scale detector element is disposed in an axial cavity of a sliding member which is affixed on the second cylinder to fit snugly, but slidably within the first cylinder. This sliding member can have a reference detector disposed on one end thereof to detect a magnetic field provided by a reference magnet disposed at one end of the first cylinder.

A gas fitting can be provided on the first cylinder to admit gas under at least a moderate pressure over ambient pressure to prevent intrusion of contaminants into the first cylinder.

The end cover can favorably include a centering mount for the longitudinal scale. In this centering mount, an end of the longitudinal scale can be affixed in a mounting block which is spring biased against a bearing having one race against the mounting block and another race against an end plate. This mounting block can be situated in a cavity in the end cover of at least slightly radial dimension than the block. The centering mount serves to give the longitudinal scale at least a limited freedom to rotate and also to maintain the same in coaxial relation with the second cylinder.

Many further objects, features, and advantages of this invention will become apparent from a consideration of the ensuing detailed description, when considered in connection with the accompanying drawings.

BRIEF DESCRIPTION OF THE DRAWINGS

FIGS. 1 and 2 are perspective and cross-sectional views, respectively, of a magnetic scaling device according to an embodiment of this invention.

DETAILED DESCRIPTION OF PREFERRED EMBODIMENTS OF THE INVENTION

Figure 3:
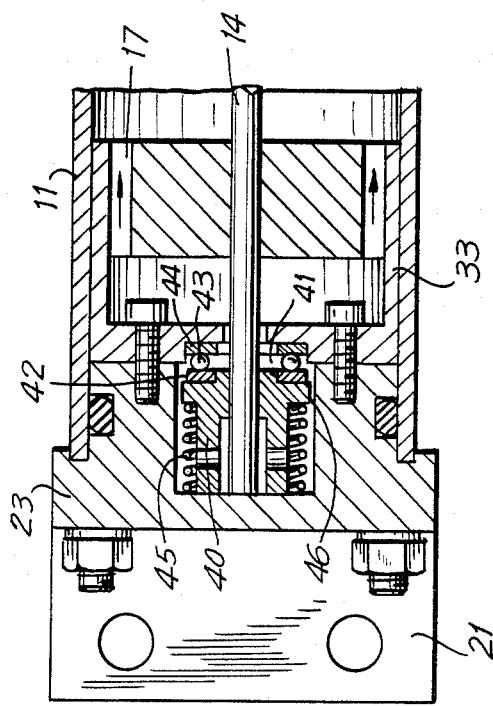
FIG. 3 is a cross-sectional view of a portion of a magnetic scaling device according to another embodiment of this invention.

With reference to the drawings, and initially to FIGS. 1 and 2 thereof, a magnetic scaling device embodying the principles of this invention has a first, outer cylinder 11. A second cylinder 12 is disposed coaxially with the first cylinder 11 in slideable relation thereto, and a third cylinder 13 is fixedly disposed within the second cylinder 12. A longitudinal rod-type magnetic scale 14 is fixedly disposed with respect to the first cylinder 11 and extends along the axis thereof.

A sliding member 15 is affixed by screws on one end of the second cylinder 12 and is dimensioned for a snug, but slideable fit within the interior of the first cylinder 11.

A detecting element 16 for detecting magnetic indicia along the magnetic scale 14 is affixed within a cavity 15A of the sliding member 15.

A ring magnet 17 is disposed within the cylinder 11 at one end thereof and substantially at its inner surface. A detecting element 18 for detecting the magnetic field of the ring magnet 17 is situated on a protruberance at an end of the sliding member 15. This element 18 which can be, for example, a Hall detector, generates a reference signal when the detecting element 18 is aligned with the position of the ring magnet 17.

A bearing 19 and an oil seal 20 overfit the second cylinder 12 at one end of the first cylinder 11 to permit sliding of the second cylinder 12 relative to the first cylinder 11 and the scale 14, while excluding oil, dust, and other contaminants from the interior of the first cylinder 11.

Mounting brackets 21 and 22 and end covers 23 and 24 are respectively disposed at the ends of the first cylinder 11. Packings 25 and 26, which, for example, can be O-rings of silicone rubber, seal the end covers 23 and 24 to the first cylinder 11.

The rod-type magnetic scale 14 has one end affixed to the end cover 23, while the bearing 29 and the oil seal 30 are disposed in the other end cover 24.

Four tie rods 27 extend through openings in the end covers 23 and 24 to hold the device together.

The detecting elements 16 and 18 have leads 28 extending to a terminal board 29 at a remote end of the second cylinder 12. In this case, the second and third cylinders 12 and 13 define an annulus through which the leads 28 can pass without interfering with the relative motion of the rod-type scale 14 and the cylinders 12 and 13.

An output signal cable 30 extends from the terminal board 29, and a waterproof seal 31 is provided over this cable 30 at the end of the second cylinder 12. A mounting nut 32 is disposed over this seal 31.

In operation, the second cylinder can be affixed to a movable portion of an associated machine tool by means of the nut 32, while the mounting bracket 21 and 22 are fixedly attached, by means of machine screws or bolts (not shown), to a fixed part of the machine tool, so that relative movement of the second cylinder 13 relative to the first cylinder 12 will directly correspond to relative motion of the fixed and movable portions of the associated machine tool.

A mounting member 33 for the ring magnet 17 is affixed onto the end cover 23 within the cylinder 11 and at the end thereof.

Gum cushions 34 and 35 are provided on radial surfaces of the sliding member 15 and the side cover 24 to soften contact of the sliding member 15 with the ring magnet 17 and the end cover 24 when the second cylinder 12 is displaced to its maximum limits.

In other embodiments, the ring magnet 17 can be disposed at other positions within the cylinder 11, for example, at the position of the end cover 24, or at an intermediate position between the ends of the cylinder 11. Alternatively, a plurality of ring magnets 17 can be utilized for generating reference signals at each of a plurality of positions of the second cylinder 12.

FIG. 3 illustrates a portion of the structure of another embodiment of this invention. In FIG. 3, elements that are shared with the embodiment of FIGS. 1 and 2 are identified with the same reference numbers, and a detailed description thereof is not repeated.

In this embodiment, a centering mechanism is provided for the longitudinal scale 14 at the axis of the cylinder 11.

The centering mount for the magnetic scale 14 includes a mounting block 40 situated in an axial cavity in the side cover 23. A bearing 41 is disposed between the mounting block 40 and the mounting member 33 for the ring magnet 17. Here, the mounting member 33 acts as a cover plate for the bearing 41. The bearing 41 has a race 42 disposed against the block 40, bearing balls 43 in the race 42, and another race 44 disposed over the balls 43 and situated against the mounting member 33. A spring 45 biases the mounting block 40 and the bearing 41 against the mounting member 33.

The diameter of the cavity in the side cover 23 is at least slightly greater than the diameter of the mounting block 40, so that a small radial clearance 46 exists between the end cover 23 and the mounting block 40.

As a result of the construction shown in FIG. 3, the magnetic longitudinal scale 14 is fixed axially with respect to the first cylinder 11, but is permitted a slight amount of rotation and yaw. Consequently, the arrangement constituted by the mounting block 40, the bearing 41, and the spring 45 serves to center the magnetic scale 14 with respect to the cylinders 11, 12, and 13. This structure also prevents erroneous detection of the indicia on the scale 14 owing to relative rotation or displacement of the scale 14 and the detector element 16.

While the devices disclosed above with reference to FIGS. 1–3 generally provide adequate protection from contaminants such as water, oil, dust, metal particles, and the like, the device can be made more resistant to such contaminants by introducing into the interior of the cylinder 11 a gas at a pressure at least slightly higher than ambient atmospheric pressure. To this end, embodiments of this invention can be constructed, for example, as shown in FIG. 4.

Figure 4:
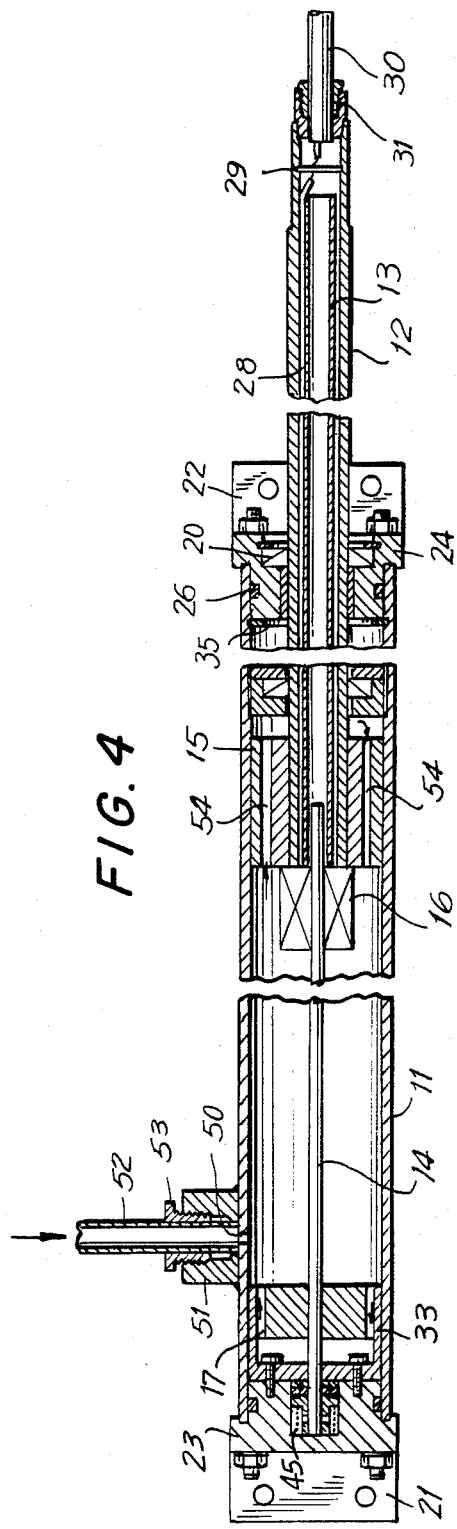
FIG. 4 is cross-sectional view of a magnetic scaling device according to a further embodiment of this invention.

In FIG. 4, elements which are shared with the previously-described embodiments are identified by the same reference numerals, and a detailed description thereof is omitted.

In this embodiment, one end of the cylinder 11 has an opening 50 communicating with the interior of the device, and a nipple 51 is provided into which a pressure line 52 is fitted. A seal 53 can be disposed on the line 52 at its fitting into the nipple 51. The pressure line 52 can provide air, or an inert gas such as nitrogen, under at least moderate pressure, that is, corresponding to at least a few centimeters of water. However, gas under high pressure could also be used.

The sliding member 15 is provided with bores 54 extending therethrough for gaseous communication with both ends of the cylinder 11. This permits the pressure to be equalized throughout the cylinder 11, as well as within the cylinders 12 and 13.

Because the pressure within the device is at least slightly higher than the ambient pressure, a small amount of gas will leak out through the bearing 19 and oil seal 20. This small leakage to the exterior of the device prevents the penetration of water, oil, dust, or other contaminants from the exterior into the casing of the device.

In an alternative construction to this embodiment, the opening 50 and nipple 51 can be provided on the second cylinder 12, rather than the first cylinder 11.

Furthermore, the present invention is not limited to magnetic scaling devices, but could be any scaling device, using, for example, photoelectric, capacitive, electromechanical, or other principles to detect relative displacment.

While several embodiments of this invention have been described in detail hereinabove, many modifications and variations thereof are possible without departing from the scope and spirit of this invention, as defined in the appended claims.

What is claimed is:

1. Scaling device comprising a first cylinder having first and second ends and an inner diameter; end cover means disposed in said first end of said first cylinder to close off the same; a longitudinal scale having detectable indicia thereon and affixed on said end cover means to be axially fixed relative to said first cylinder and disposed coaxial therewithin, the longitudinal scale having a predetermined radial extent; a second cylinder having an inside diameter greater than the radial extent of said scale and an outside diameter less than the inner diameter of said first cylinder, the second cylinder being disposed coaxially with said first cylinder and said scale; sealing fitting means disposed in said second end of said first cylinder and journalling said second cylinder for axial longitudinal movement thereof with respect to said first cylinder, said second cylinder extending through said fitting means within said first cylinder and over said scale; and scale detector means disposed to move with said second cylinder to detect said indicia on said scale and to generate scale signals in response to longitudinal relative displacement of said first and second cylinders.

2. Scaling device according to claim 1, further comprising a third cylinder having an outer diameter less than the inside diameter of said second cylinder and affixed therewithin over said scale.

3. Scaling device according to claim 2, wherein said scale detector means has at least one lead, and said second and third cylinders define an annulus through which said at least one lead extends.

4. Scaling device according to claim 3, further comprising a terminal board disposed within said second cylinder at an end thereof remote from said first cylinder for receiving a signal cable and coupling said at least one lead thereto.

5. Scaling device according to claim 1, wherein said scale detector means includes a sliding member affixed on said second cylinder and snugly but slidably fitting within said first cylinder and having an axial cavity, and a scale signal detecting element disposed in said cavity in proximity to said scale.

6. Scaling device according to claim 5, wherein said scale detector means further includes a reference signal detecting element disposed at an end of said sliding member; and further comprising a reference ring magnet affixed at the interior of said first cylinder, said reference signal detecting element providing a reference signal in response to alignment of said reference signal detecting element with said ring magnet.

7. Scaling device according to claim 1, further comprising means for introducing into one of said first and second cylinders gas under at least a moderate pressure over ambient pressure to help prevent intrusion of contaminants into said first cylinder.

8. Scaling device according to claim 1, further comprising reference means for providing a reference index and reference signal generator means for providing a reference signal when the same is aligned with said reference index, said reference index and said reference signal generator means both being disposed within said first cylinder, with one of said reference index and said reference signal generator means being affixed in said first cylinder and the other being adapted to be displaced with said second cylinder.

9. Scaling device according to claim 1, wherein said end cover means includes a centering mount for said longitudinal scale to which an end of the latter is affixed and for maintaining said scale in coaxial relation with said second cylinder.

10. Scaling device according to claim 9, wherein said centering mount includes an end plate, a bearing having one race disposed against said end plate and another race, a mounting block to which said scale is affixed, said mounting block being situated in a cavity in said end cover means of at least slightly greater radial dimension than said block, and resilient biasing means biasing said block against said other race.

* * * * *